FIG. 13.

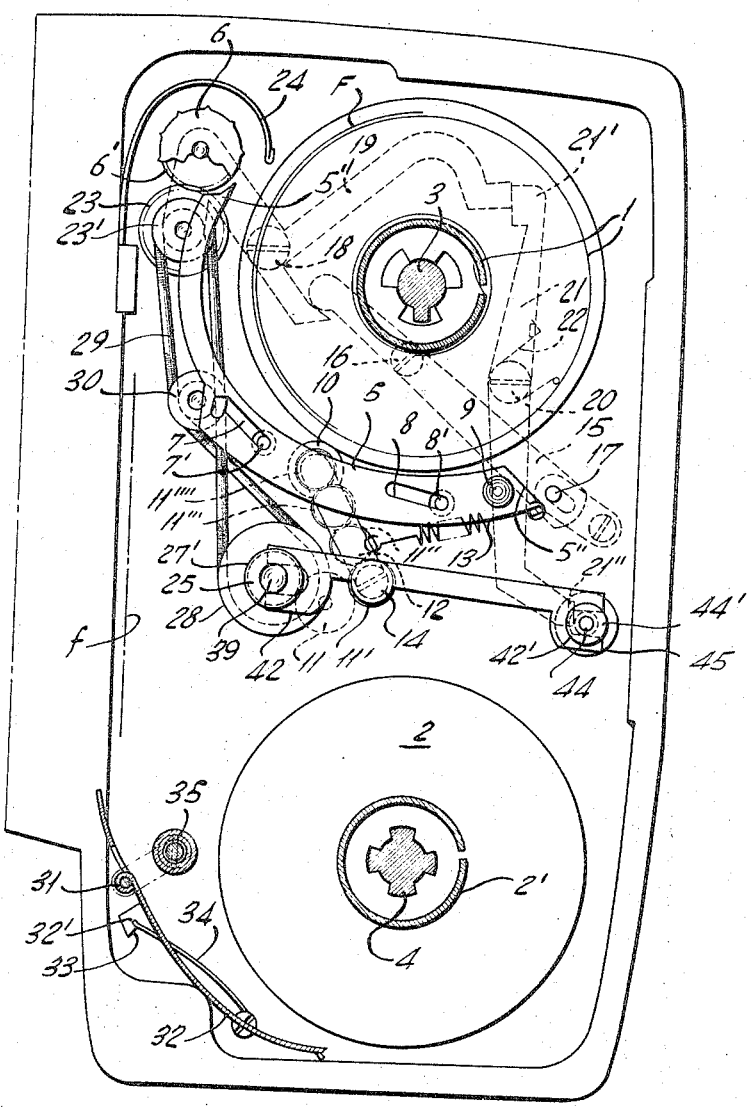

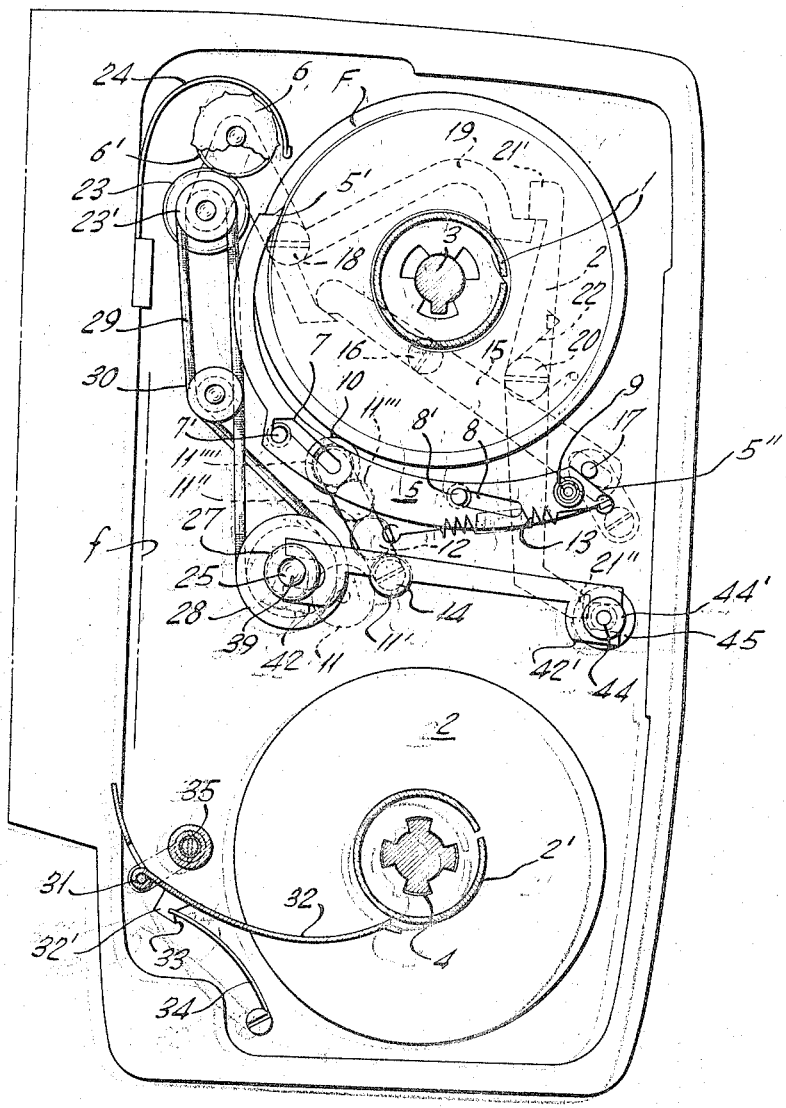

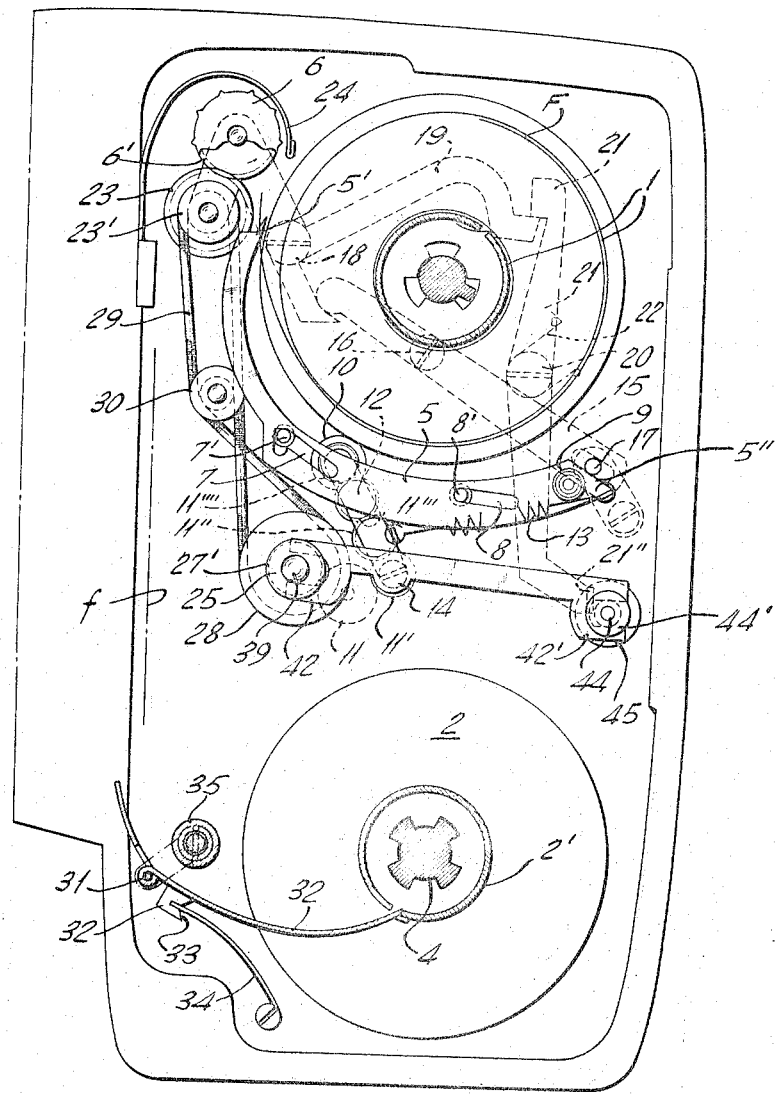

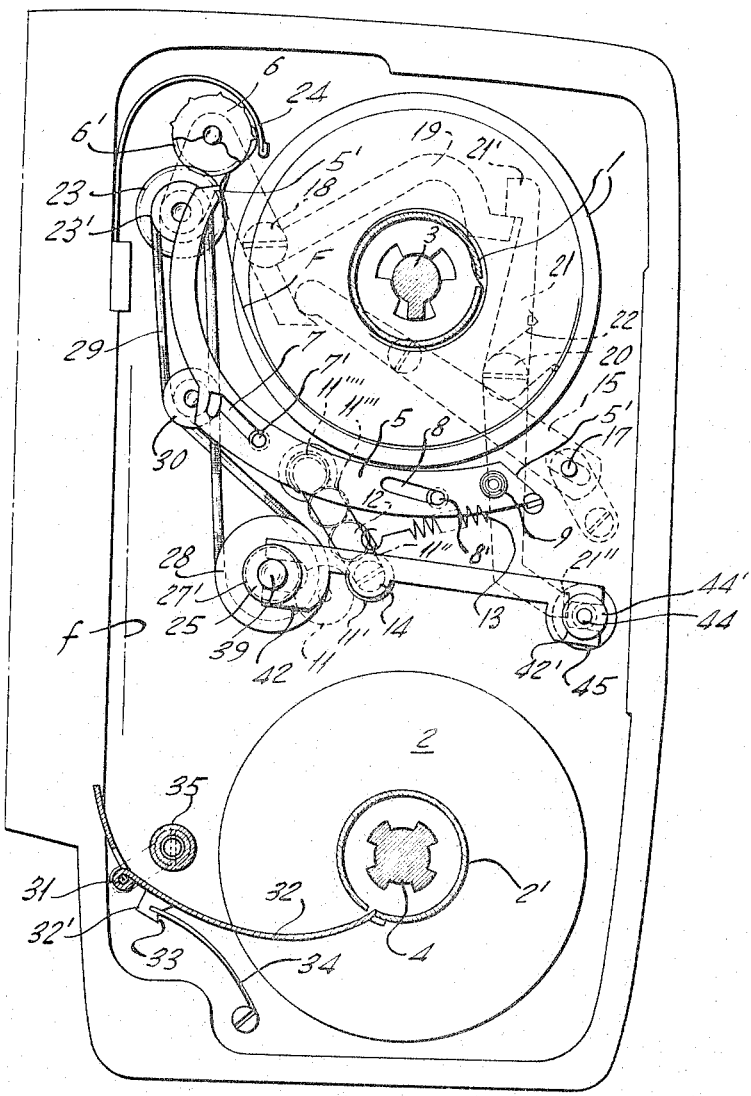

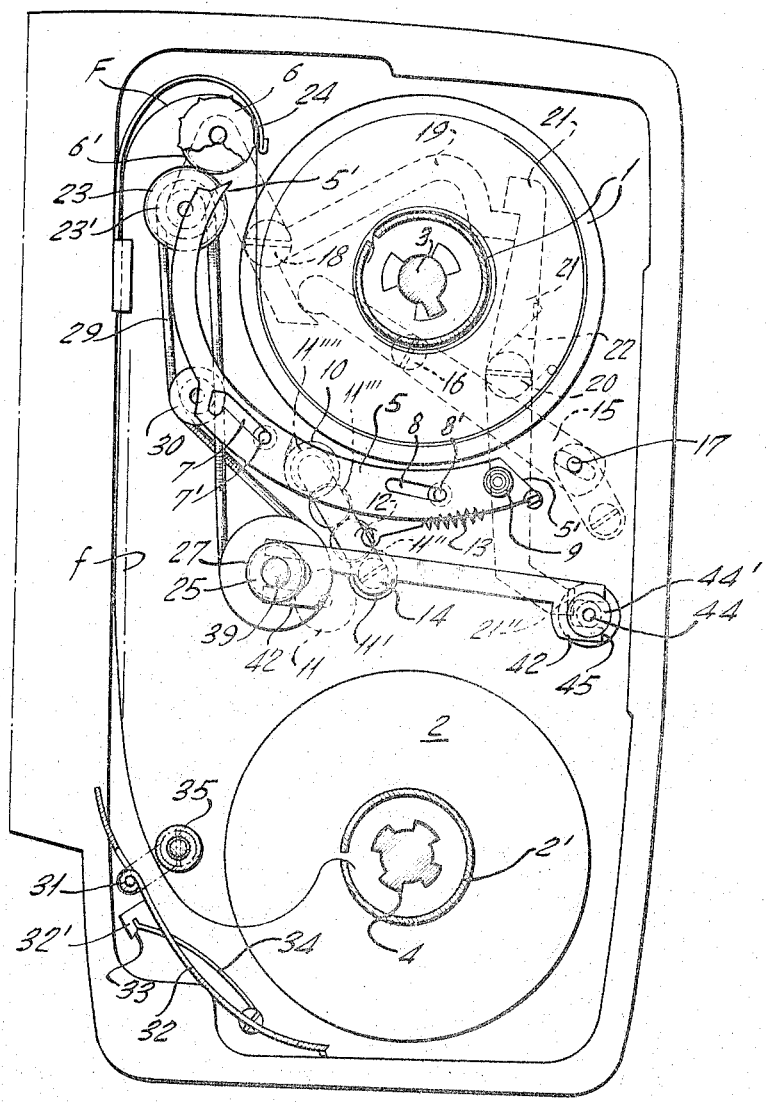

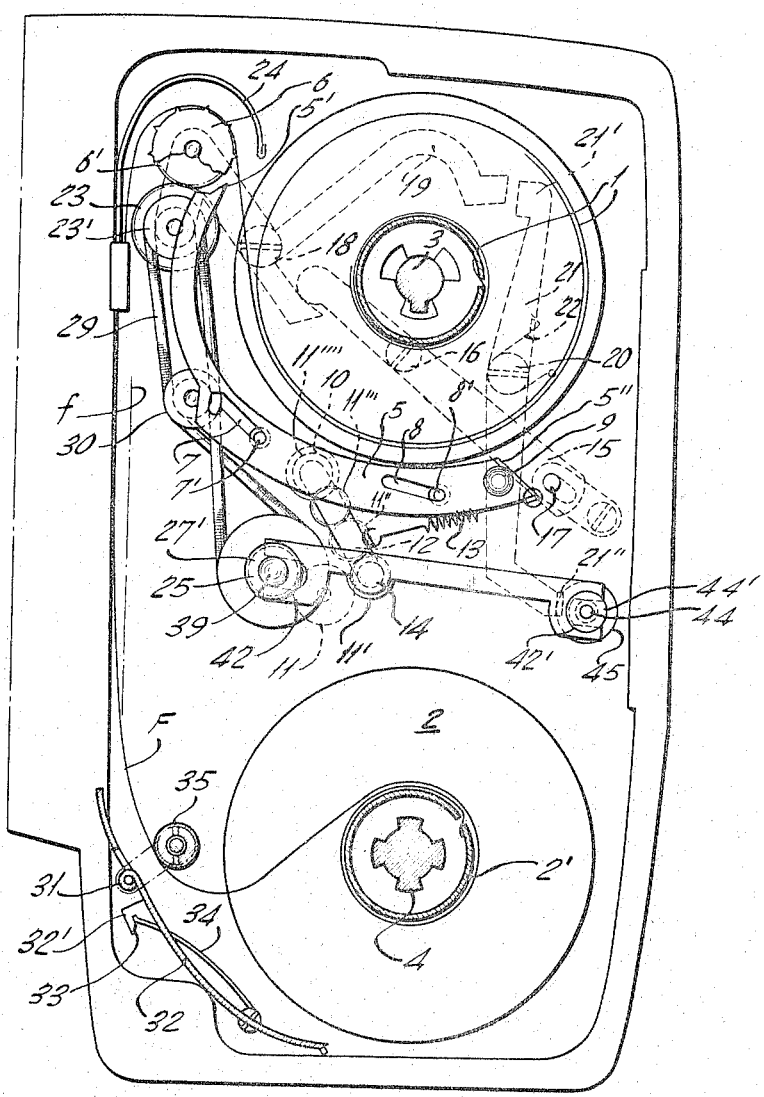

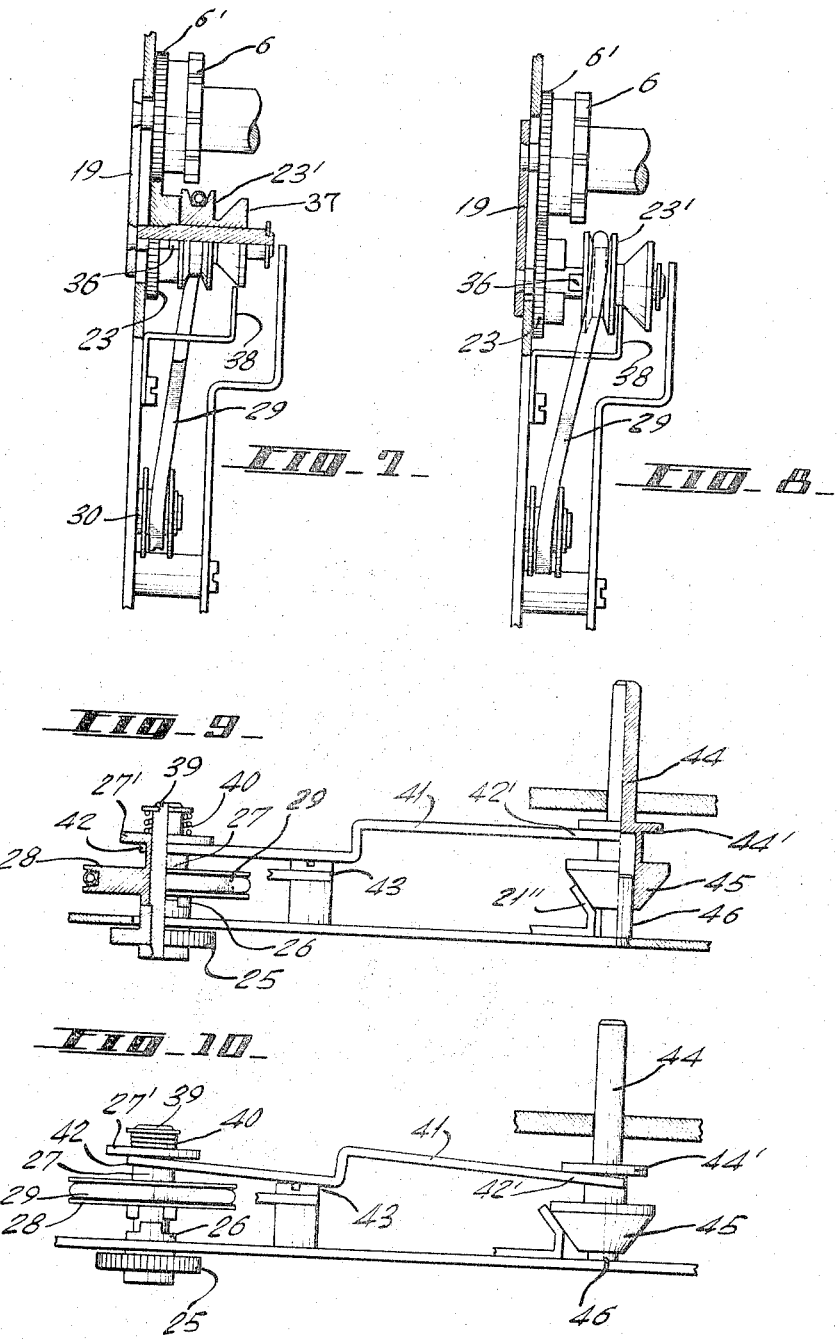

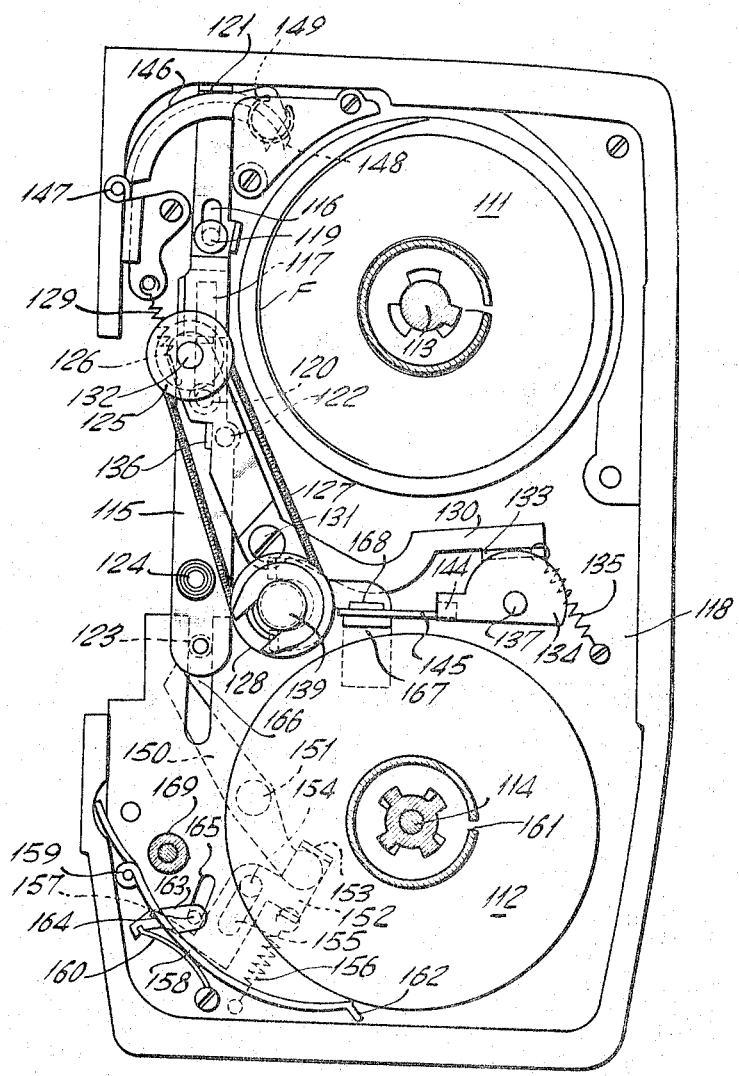

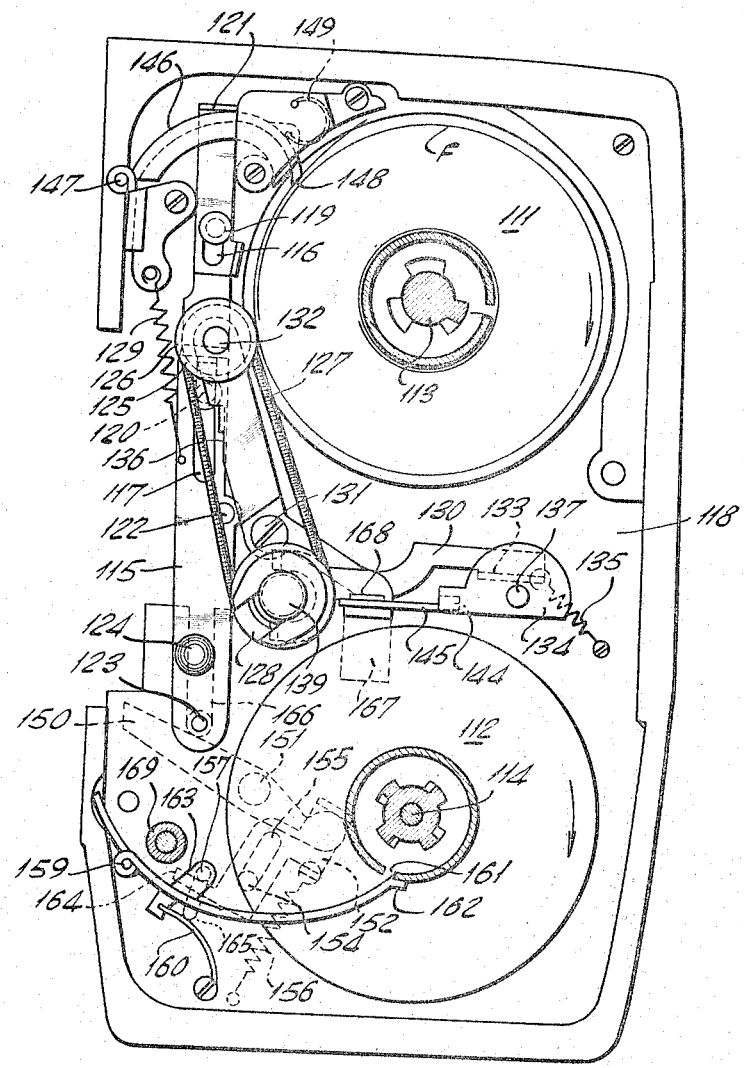

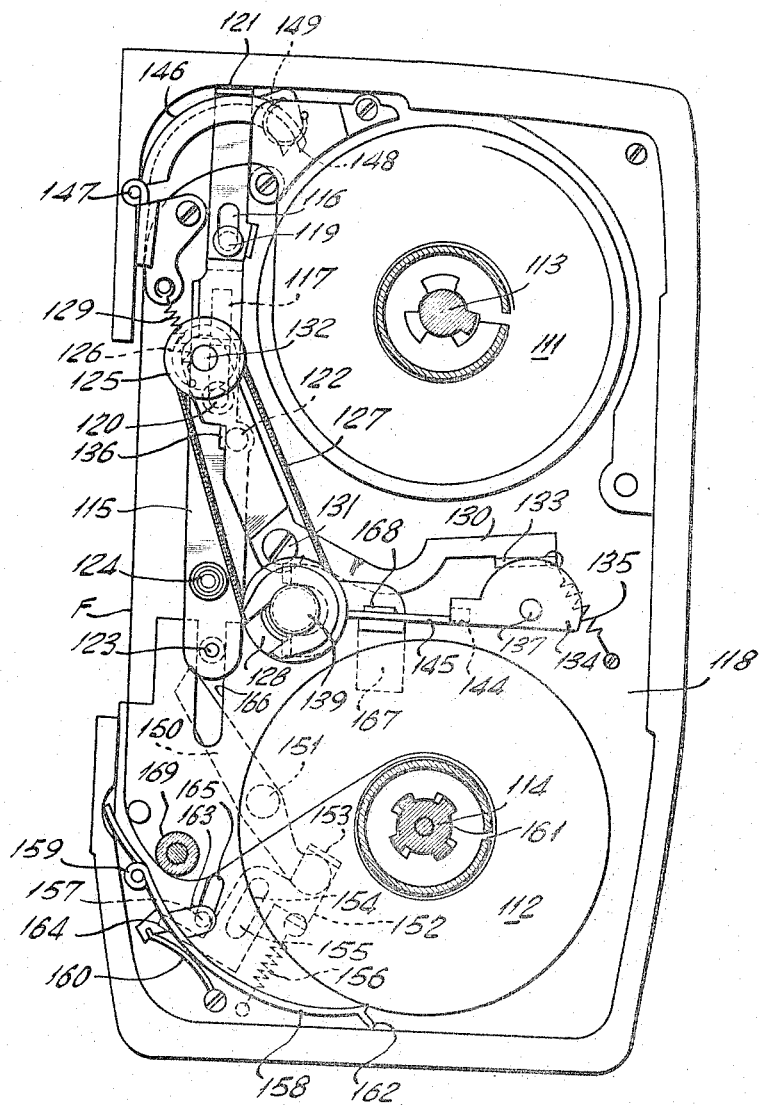

Aug. 22, 1967　　　HIDEO MIYAUCHI ETAL　　　3,337,146
AUTOMATIC FILM THREADING MECHANISM
Filed Oct. 2, 1963　　　　　　　　　　　　　12 Sheets-Sheet 12
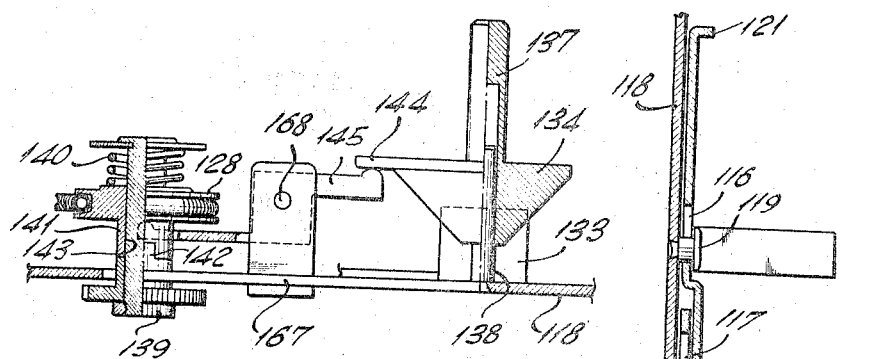
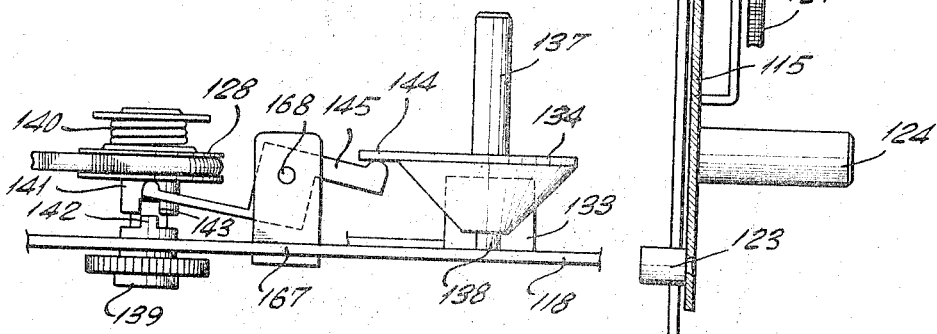
INVENTORS
HIDEO MIYAUCHI
SATOSHI KAMIJO
BY Stanley Walder
ATTORNEY

United States Patent Office 3,337,146
Patented Aug. 22, 1967

3,337,146
AUTOMATIC FILM THREADING MECHANISM
Hideo Miyauchi and Satoshi Kamijo, Nagano-ken, Japan, assignors to Kabushiki Kaisha Yashica, Tokyo, Japan, a corporation of Japan
Filed Oct. 2, 1963, Ser. No. 313,386
Claims priority, application Japan, Oct. 10, 1962, 37/45,053; Dec. 25, 1962, 37/57,480
12 Claims. (Cl. 242—55.11)

The present invention relates generally to improvements in film handling equipment such as cameras, projectors and the like and it relates more particularly to an improved automatic film threading mechanism for moving picture cameras.

The loading of a moving picture camera, particularly 8 millimeter and 16 millimeter cameras is at best a difficult and awkward operation. Not only does the beginner and novice, but expert as well finds this task trying and inconvenient and frequently resulting in the exposure and spoiling of long lengths of film. As a consequence, considerably less film is generally employed for photography than is available on the roll. There have been many mechanisms and expedients proposed for overcoming the drawbacks attending the loading of a camera but these have proven far from satisfactory. The use of a film cartridge is expensive and usually increases the bulk of the camera. The automatic film threading devices heretofore proposed are complex and expensive devices and highly unreliable.

It is, therefore, a principal object of the present invention to provide an improved film handling apparatus.

Another object of the present invention is to provide an improved moving picture camera.

Still another object of the present invention is to provide an improved automatic film threading mechanism for use in moving picture cameras and the like.

A further object of the present invention is to provide an improved automatic film threading mechanism of the above nature which is simple, rugged, reliable, compact and easy to operate.

The above and other objects of the present invention will become apparent from a reading of the following description taken in conjunction with the accompanying drawings, wherein:

FIGURE 1 is a side elevational view of a camera automatic film threading mechanism embodying the present invention, the feed spool and the empty take-up spool being shown in operative position before the threading of the film;

FIGURE 2 is a view similar to FIGURE 1, the mechanism being illustrated in prepared condition for automatic film threading;

FIGURE 3 is a view similar to FIGURE 1 showing the first stage of the automatic film threading operation;

FIGURE 4 is a view similar to FIGURE 1 showing the second stage of the film threading operation;

FIGURE 5 is a view similar to FIGURE 1 showing the engagement of the threaded film by the take-up reel;

FIGURE 6 is a view similar to FIGURE 1 showing the camera in its film loaded and threaded condition;

FIGURE 7 is an enlarged detailed fragmentary end view of the sprocket wheel drive in coupled condition;

FIGURE 8 is a view similar to FIGURE 7 with the sprocket wheel drive shown in uncoupled condition;

FIGURE 9 is an enlarged detailed fragmentary end view of the main drive coupling mechanism shown in coupled condition;

FIGURE 10 is a view similar to FIGURE 9 with the coupling mechanism shown in uncoupled condition;

FIGURE 11 is a side elevational view of another embodiment of the present invention with the feed and take-up rolls being shown in their initial inserted positions;

FIGURE 12 is a view similar to FIGURE 11, the mechanism being shown prepared for automatic film threading;

FIGURE 13 is a view similar to FIGURE 11, the mechanism being shown with the film threaded and engaged by the take-up reel;

FIGURE 14 is a view similar to FIGURE 11, the mechanism being shown at the termination of the loading operation;

FIGURE 15 is an enlarged, detailed fragmentary end view of the auxiliary drive coupling mechanism in coupled condition;

FIGURE 16 is a view similar to FIGURE 15, the coupling mechanism being illustrated in uncoupled condition; and FIGURE 17 is an enlarged fragmentary end view of the threading set mechanism.

In a sense the present invention contemplates the provision of an automatic film threading mechanism comprising a feed spool and a take-up spool, main drive means for rotating said take-up spool, a first film guide means disposed adjacent said feed spool and movable between an advanced film guide position and a retracted position, a second film guide means disposed adjacent said take-up spool and movable between an advanced film guide position and a retracted position, auxiliary means for driving the film on said feed spool and movable between an advance film drive condition and a retracted dormant condition, and selectively actuatable means movable between an advanced and a retracted position for advancing said first guide means to its film guide position and said auxiliary drive means to its drive condition.

According to a preferred form of the present mechanism, the first film guide means comprises a sprocket wheel which is advanced and retracted toward and away from a curved guide plate and is selectively rotated by the main drive. The auxiliary drive means includes a friction wheel engaging the feed spool and is likewise rotated by the main drive to rotate the spool in a reverse or film take-up direction. A film transfer member engages the film in the take-up spool, transfers it to the sprocket wheel under the pressure of the film being drawn by the feed spool. The second guide means comprises a track member or arm pivoted at one end and having its other end swingable into and out of engagement with a slot formed in the hub of the take-up spool. A toggle spring urges the track member at corresponding opposite sides of a dead center position toward and away from the spool hub and the track is swingable to its retracted position under the pressure of the advancing film. According to another embodiment of the present invention the first guide means is defined by a curved guide plate pivoted at one end and having a free end movable between an advanced and retracted position in and out of engagement with the film on the feed spool. The guide plate is alternatively urged to opposite positions by a toggle spring. The auxiliary drive means rotates the feed roll film in a feed direction and the pressure of the film on the guide plate urges it to its retracted position.

Referring now to the drawings, and particularly to FIGURES 1 and 10 thereof, which illustrate a preferred embodiment of the present invention the reference numerals 1 and 2 generally designate spools which are mounted on supply shaft 3 and take-up shaft 4 respectively. The film is indicated by the character F. A curved film transfer member 5 functions to lead the film engaged at its end to a threading sprocket 6. The movement of the film transfer member 5 is controlled by guide slots 7 and 8 formed therein in cooperation with pins 7' and 8' passing through these guide slots and secured to the camera main body. The guide slot 7 terminates in a hook-shaped section at one end thereof to permit the releasable locking of the transfer member 5 in cooperation with the pin 7', as hereinafter described. The upper end of the transfer member 5 terminates in a sharp claw 5' which is positioned below the threading sprocket 6, and the other end is defined by an abutment edge 5'' confronting a pin 17 projecting from the coupled structure for shifting the position of the sprocket 6, which will be described later. A knob 9 is mounted on the transfer member 5. A roller 10 adapted to engage the outer periphery of the feed spool 1 for driving it in the direction opposite to that of film unwinding, is, through a train of mutually meshing gears 11, 11', 11'' . . . coupled to a gear 25 which is in turn coupled to the camera drive main power shaft so that it may be rotated by depressing the usual shutter release button. A gear mounting member 12 upon which gears 11', 11'' . . . are mounted and the film transfer member 5 are connected by a spring 13 so that these two members may pull each other, said gear mounting member 12 being swingably secured at its lower end to a shaft 14. As a result, when the knob 9 is pushed to the right the film transfer member 5 is advanced to the outer edge of the spool 1, being guided by the guide slots 7 and 8 and the respective pins 7' and 8'. Then, through the spring 13, the gear mounting member 12 is drawn and swings clockwise about the shaft 14, and in response to the movement of the film transfer member 5 the roller 10 is pressed against the periphery of the spool 1. The transfer member 5 is shifted to such an extent that the spring 13 is strongly tensioned, and the member 5 moves slightly upward so that the pin 7' engages the hooked section of the guide slot 7 and accordingly the film transfer member 5 is releasably locked in its advanced position, being urged toward its retracted position by the tension of the spring 13 (see FIG. 2).

A rocker arm 15 pivoted to the camera main body by a shaft 16 is provided at its lower end with a pin 17 adjacent to and confronting said abutment edge 5'' and its upper end is positioned adjacent to the end of one of the leg members of an h-shaped bell crank 19 pivoted to the camera main body by a shaft 18. The end of the other leg member of said bell crank 19 is positioned opposite to the hooked end 21' of another rocker arm 21 pivoted to the camera main body by means of a shaft 20. A hairpin spring 22 engages the arm 21 to urge the lower bent-up section 21'' thereof against a taper cone 45 for alternatively connecting and disconnecting the main drive means as will be described later. The arms 19 and 20 together with the taper cone 45 and the associated shaft 44, constitute a coupling mechanism for the shifting of the sprocket 6.

The sprocket 6, together with a gear 6' secured thereto is mounted at the upper end of the bell crank 19, and another gear 23 in mesh with the gear 6', is, together with a pulley 23' an intermediate clutch 36, mounted to the end of an upper bent part of the bell crank 19. Accordingly, when the film transfer member 5 is moved backward or advanced and the abutment edge 5'' pushes the pin 17, the rocker arm 15 swings counterclockwise about the shaft 16. As a result, the upper end of the rocker arm 15 pushes one of the leg members of the bell crank 19 to cause clockwise swing of the bell crank 19 about the shaft 18 and bring the sprocket 6 in close proximity to the guide wall 24 adjacent to the upper periphery of the sprocket 6 (see FIG. 2).

The shaft of the gear 25 is coupled to the camera main drive shaft and is releasably connected by a jaw type clutch 26 to a hollow shaft 27 having a pulley 28 mounted thereon. A crossing extendable tension spring belt 29 extends between the pulleys 28 and 23' and along an intermediate pulley 30. As will be described later with reference to FIGURES 7 and 8, and in connection with the passing of the belt 29 the intermediate pulley 30 and the pulley 23' are mounted at respectively different distances from the camera wall so that the clutch 36 is normally urged to a coupled state.

Adjacent to the take-up spool 2 is a film guide member 32 pivoted on a shaft 31 and having a projecting lug 32' provided with V-shaped groove 33 which engages one end of an arcuate leaf spring 34 secured at its other end to the camera main body so that the film guide member 32 may be urged in toggle fashion in two opposite directions with respect to the intermediate dead point. The film guide member 32 may be urged either to a retracted position indicated in FIGURE 1 or may be swung by pressure on the free end thereof to the peripheral surface of the hub 2' of the spool 2, by reason of the toggle spring 34. A film guiding post 35 is provided and consists, as is well known, of a suitable resilient friction roller.

As seen in FIGURES 7 and 8 a conventional jaw type clutch 36 releasably couples the gear 23 and the pulley 23' by the relative axial movement thereof. Secured to the pulley 23 is a taper cone 37, which is engaged by a control member 38 which in turn is located in the area to which the sprocket 6, its gear 6', the gear 23 and the pulley 23' are retracted from the advanced film engaging position on swinging movement of the bell crank 19. As a result, upon said retraction, under the influence of the control member 38, the taper cone 37 is shifted in the axial direction so that the clutch 36 is disengaged.

FIGURE 7 illustrates the clutch 36 in its engaged state and FIGURE 8 illustrates the clutch 36 in its disengaged state owing to withdrawal of the sprocket 6.

As seen in FIGURE 9 the hollow shaft 27 is urged by a compression spring 40 wound around the outer end part of a support shaft 39 so that the clutch 26 is normally engaged. A rocker plate 41 terminating in fork members 42 and 42' at its opposite ends is supported by a fulcrum shaft 43. The fork member 42 engages the hollow shaft 27 and bears against the flange 27' while the other fork member 42 engages the shaft 44 and bears against the flange 44', the shaft 44 being pushed down by the closing movement of the camera side lid which is brought to bear on the free end thereof. A fixed shaft 46 slidably axially engages the shaft 44 for guiding its movement. As seen in FIGURE 10, when the shaft 44 is pushed down by the closing of the camera side lid, the flange 44' pushes down the fork member 42' of the rocker plate 41, to thereby lift the other fork member 42 which pushes up the hollow shaft 27 against the urging of the spring 40 and disengages the clutch 26.

Considering now the operation of the mechanism described above, a spool 1 loaded with film and an empty take-up spool 2 are mounted on the supply shaft 3 and the take-up shaft 4 respectively, as seen in FIGURE 1. The film guide member 32 is then advanced against the urging of the toggle spring 34 beyond the dead center point so that its free end bears against the film take-up hub 2'. The film transfer member 5 is advanced to the right by manipulating the knob 9 to cause the pin 7' to engage the hooked section of the guide slot 7, the film transfer member 5 being temporarily locked in the advanced position. Concurrently, the gear mounting member 12 is pulled by the film transfer member 5 by way of the spring 13 to urge the roller 10 into pressing contact with the peripheral edge of the spool 1 and the spring 13 is loaded. Simultaneously therewith, the abutment edge 5'' pushes the pin 17 to swing the rocker arm 15 so that its upper end swings the bell crank 19 clockwise about the shaft 18, causing the sprocket 6 to be shifted to a position in close proximity to the guide wall 24 against the urging of the spring belt 29, thus preparing for film engagement, and further, causing the other leg member of the bell crank 19 to be locked in its advanced position by the hook end 21' of the rocker arm 21 under the urging of the spring 22, as described above (see FIG. 2).

The camera shutter release button (not shown)) is depressed to rotate the gear 25 which is coupled to the main driving power shaft and rotates the roller 10 through gears 11, 11', 11" . . . which in turn causes the spool 1 to rotate in a reverse direction, that is, opposite to the film unwinding direction. Concurrently, since the clutch 26 is in an engaged condition, the pulley 28 rotates in the counterclockwise direction. As a result, the spring belt 29 is driven, causing, through the pulley 23' and due to the engaged state of the clutch 36, the gear 23 and the gear 6' in mesh therewith to rotate to thereby rotate the sprocket 6 in the counterclockwise direction.

As the spool 1 rotates in a counterclockwise direction, due to unwinding tendency of the film and the centrifugal force, the film rotates with the leading end thereof tending to move outwardly, so that soon the perforation of the film (one for claw transportation or one specially arranged for this purpose) engages the claw 5' of the film transfer member 5 occupying its advanced position so that the film is temporarily prevented from rotating freely. Further rotation of the spool 1 and the tension of the film cause the film to pull the film transfer member 5 in the direction of said rotation. This pulling force is applied vertically downwardly to pull the film transfer member 5 downwardly. As a result, the hooked section of the guide slot 7 is released from the temporary engagement with the pin 7', and under the influence of the spring 13, the film transfer member 5 is retracted to its original position (see FIG. 4).

The retraction of the claw 5' transfers the engaged film end to the area adjacent to the sprocket 6 and the guide wall 24 so that the perforations at the film end engage the sprocket 6, and accordingly, as the sprocket rotates the film is transported toward the film exposure section f, where the film is engaged by the usual film transporting claw and by its intermittent movement is further transported downwardly. The film is then guided by the film guide member 32 in its advanced position until it reaches the take-up hub 2' of the spool 2.

During the above sequence, the spool 2, which has started rotation together with the take-up shaft 4, is prevented from further rotating because the free end of the film guide member 32 as urged by the toggle spring 34 engages the slot of the take-up hub 2', as seen in FIG. 4, and the take-up shaft 4 driven through a friction coupling is also prevented from rotating. Accordingly, the end of the film transported to the take-up hub 2' enters the slot as directed by the film transfer member 32. After full entry of film end into slot, the advancing film bears down upon the film guide member 32, as seen in FIGURE 5, so that the free end thereof is disengaged from the slot, and the film guide member which is urged beyond its dead center point and is automatically returned to its original retracted position by the resiliency of the toggle spring 34 in the opposite direction. Thus the automatic threading operation is completed.

The shutter button is then released and the camera side lid is closed to bear on and depress the shaft 44 in the direction of the arrow shown in FIGURE 9. Consequently, the flange 44' depresses the fork member 42' of the rocker plate 41, and at the same time the taper surface of the taper cone 45 pushes the bent-up part 21" of the rocker arm 21 sideways. When one end of the rocker plate 41 is depressed, the other end raised, and the fork member 42 raises the flange 27' against the resiliency of the spring 40 so that the hollow shaft 27 is lifted and the clutch 26 is disengaged, thus disconnecting the transmission of power from the main power shaft to the pulley 28.

Furthermore, the outward movement of the bent-up part 21" causes the rocker arm 21 to swing about the shaft 20 in the direction of the arrow as shown in FIGURE 6 so that the hook-shaped part 21' disengages the bell crank 19. As a result, the pulley 23, mounted on the hook-shaped part of the bell crank 19 and under influence of the tension of the spring belt 29, is pulled downward, and the bell crank 19 swings counterclockwise about the shaft 18 so that the sprocket 6 is automatically withdrawn from the film engaging area. The film is thus disengaged from the sprocket 6 and forms a loop, that is, a free slack for smooth intermittent transportation of the film.

The taper cone 37 secured to the pulley 23' upon retraction with the sprocket 6 comes into engagement with the control member 38. Being prevented from continuing the shifting movement in the same plane of movement, the taper cone 37 is shifted in the axial direction so that the clutch 36 is disengaged and the transmission of driving power to the gear 23 through the pulley 23' mounted with the spring belt 29 is stopped.

As set forth above, after the completion of the automatic threading operation, a film loop for assuring smooth intermittent transportation of the film is automatically formed and the full necessary operation is accomplished.

In the above described example the power transmission to the sprocket 6 is broken at two places so as to decrease the load exerted on the main power source by the exposure and the film transporting operation during the photography sequence thus achieving successful and accurate photographing operation. It is not necessary to arrange such power disconnection at two places, disconnection simply at one place being usually sufficient.

It should be noted that the intermediary pulley 30 and the pulley 23' are at respective different distances from the wall of the camera main body so that the spring belt 29 is inclined with respect to the camera wall as shown in FIGURES 7 and 8. This inclined arrangement of the spring belt 29 is intended for ready and positive engagement of the clutch 36 on shifting of the sprocket 6 into the film engaging area due to application of the component force produced by the inclination, to the pulley 23'.

Figure 13:
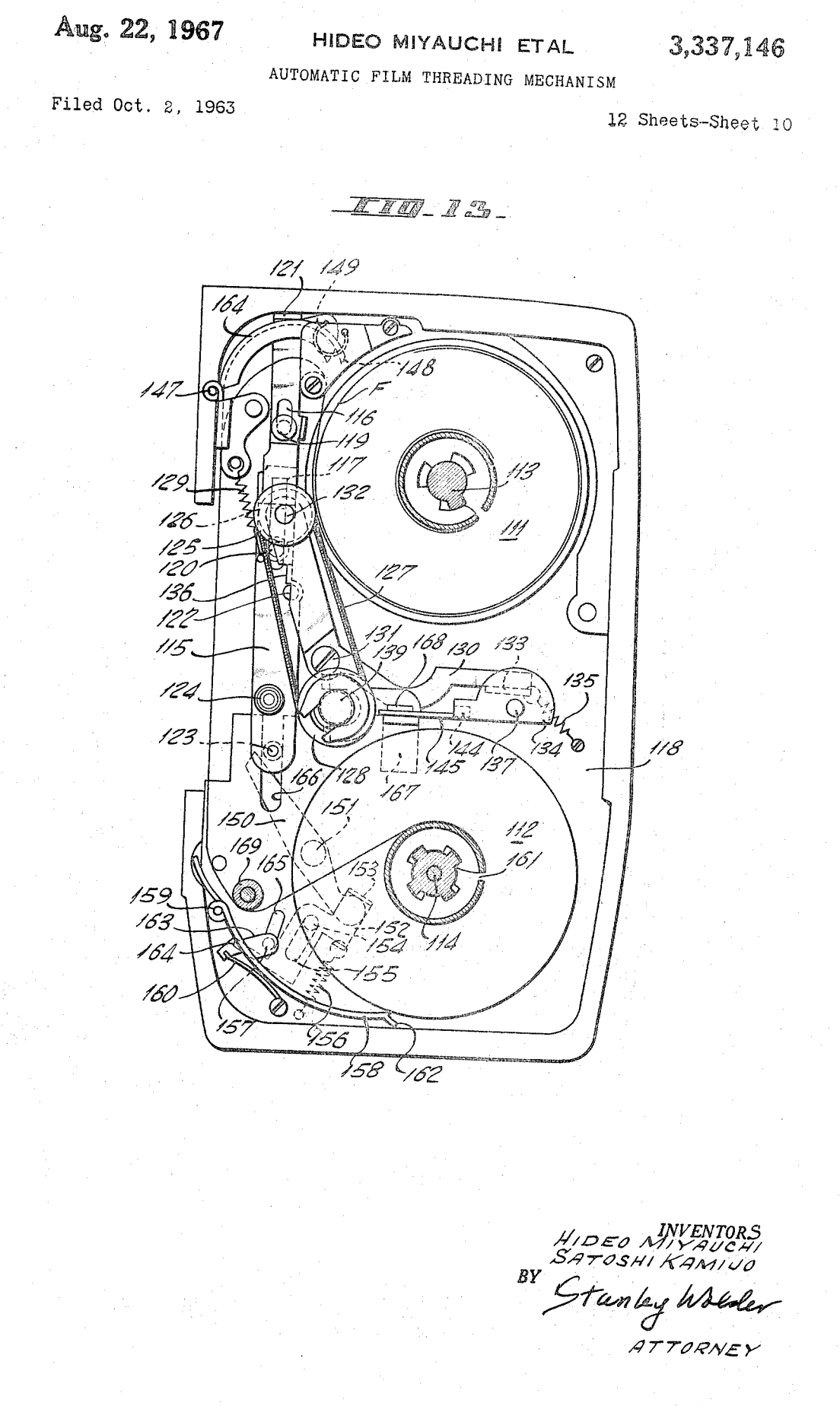

Referring now to FIGURES 11 to 17 of the drawings which illustrate another embodiment of the present invention, the reference numerals 111 and 112 designate feed and take-up spools which are mounted on a supply shaft 113 and a take-up shaft 114 respectively. The film is indicated by the character F. The movement of a set plate 115 functioning as a preparatory member for the film threading operation is controlled by guide slots 116 and 117 formed therein in cooperation with pins 119 and 120 passing through respective of these guide slots and secured to the camera main body 118. The set plate 115 is formed with a bent hook-shaped part at the upper end and is provided with projecting detent members 122 and 123 at about the middle and at the bottom end respectively. Further plate 115 is provided with a manually operated knob 124 and is urged upwardly by a spring 129. A driven roller 125 is adapted to register with the spool 111 and bear upon the film on the feed spool 111 in such a manner that the film may be driven and rotated in the film feed direction, and is connected with the camera main power source (not shown) for shutter operation and film transportation through a pulley 126 mounted coaxially with said roller 125, a spring belt 127 and a pulley 128, and is rotated by depression of the common shutter release button.

A bell crank rocker arm 130 is swingably mounted on a shaft 131 secured to the camera main body 118 and is provided at the end of the front arm with a shaft 132 supporting both the roller 125 and the pulley 126 and at the end of the other arm with a bent-up edge 133 adjacent to the inclined plane of a taper cone 134, as shown in FIGURES 5 and 6. Further, the rocker arm 130 is urged to swing clockwise about the shaft 131 by a spring 118 whose one end is secured to the camera main body 118, as shown in FIGURES 1 and 4. Near the front end of the rocker arm 130, there is provided an upstanding ear 136 engaging the detent 122 on the set plate 115. Accordingly, when the detent 122 is disengaged from the ear 136 by downward movement of the set plate 115, said detent 122 is swung clockwise by the spring 135 and the roller 125 is urged into engagement with the film wound on the supply spool 111. A shaft 137 of the taper cone 134, as shown in FIGURE 5, slidably engages a shaft 138 secured to the camera main body 118 and is urged outwardly by a spring 140 bearing on the pulley 128 to resiliently urge it into engagement with a driving and rotating shaft 139.

The shaft 139 is rotated through a suitable reduction mechanism by the camera main power source and is provided at its front end, with lug 142 which registers with and loosely mates a recess 143 in a driven shaft 141 secured to the pulley 128 in such a manner that the lug 142 and the recess 143 may be releasably intercoupled under the influence of the spring 140. The coupling and uncoupling between the lug 142 and the recess 143 is effected by way of a pivoted lever 145, one end of which underlies the pulley 128 and the other end of which underlies a projecting part 144 of the taper cone 134, through the upward and downward movement of the taper cone 134 along the shaft 138. Since the free end of the shaft 137 in its extended position projects sideway of the camera main body 118 beyond the closed position of the side lid of the camera, when the side lid (not shown) is closed, then said shaft 137 is depressed inwardly by the inner face of the side lid and the pulley 128 is uncoupled from the shaft 139 by the swinging of the lever 145.

A film guide wall 146 is engaged by the above mentioned hook-shaped part 121 at the upper end of the set plate 115 and is swingably supported at one end by a hinge 147 so as to move upwardly or downwardly. The curved upper part 148 of the film guide 146 is adjacent to the peripheral part of the film F wound on the supply spool 111 and is engaged by an arcuate toggle spring 149 connected to the camera body in such a manner that said upper part 148 may be positioned a certain distance from the peripheral part of the film F as shown in FIGURES 1 and 2, or urged into contact with this peripheral part. That is to say, downward movement of the film guiding wall 146 is caused with downward movement of the operation plate 115, while its upward movement is, as mentioned later, caused by the pressure of the film itself when the head of the film F is on the way to the film gate along the curved inward part of the film guide wall 146.

A lever 150 is pivoted to a shaft 151 secured to the camera main body 118. One end of the lever 150 engages the detent 123 on the set plate 115, while the other end engages the bent-up part 153 of a slide member 152. The slide member 152 provided with a slot 155 with which slidably registers a pin 154 mounted on the camera main body 118. Further, the slide member 152 is pulled by a tension spring 156 and one side thereof is engaged by a detent 157 which, as later described, limits said member 152 to a linear movement.

A second film guide wall 158 is pivoted to the camera main body 118 by a hinge 159 in such a manner that said film guide 158 may be caused to move upwardly or downwardly by a spring piece 160, forming a fulcrum at the hinge 159. Further, the top 162 of said film guide 158 is bifurcated in such a manner that during upward movement of the film guide 158, said top 162 may engage a film engaging aperture or slot 161 formed in the hub of the spool 112 and thus guide the end of the transported film into the interior of said aperture 61. The detent member 157 is located on a lug 163 projecting from the film guide 158 and engages an extension 164 on the slide member 152 so that the detent 158 may be pushed up together with oblique-upward movement of the slide member 152, thereby moving the film guide 158 to its upper advanced position. A guiding groove 165 is formed on the camera main body 118 and engages the detent 157 and another groove 166 for guiding the detent 123 on the lower end of the set plate 155 is similarly formed in the camera main body 118. An L-shaped member 167 supports the link lever 145 of which the center part is pivotally supported by a shaft 168. 169 denotes a film guiding roller.

Considering the operation of the threading mechanism last described, the side lid of the camera is opened and the supply spool 111 and the take-up spool 112 are mounted on the supply shaft 113 and the take-up shaft 114 respectively as shown in FIGURE 1 and the operation plate 115 is then pushed down against the resilience of the spring 129 by manipulating the knob 124. The hooked part 121 at the upper end of the set plate 115 causes the film guide 146 to swing downwardly about the hinge 147. After moving downwardly at a certain angle, that is beyond dead center, the film guide 146 is promptly, fully advanced downwardly by the toggle spring 149 and the upper part 148 of the film guiding wall 146 is urged into engagement with the peripheral part of the film on the spool 111. On the other hand, downward movement of the detent 122 of the set plate 115 releases the rocker arm 130 with the bent-up piece 136 so that the spring 135 swings the rocker arm 130 clockwise about the shaft 131 to bring the roller 125 into contact with the peripheral part of the film wound on the spool 111. Also, downward movement of detent 123 on the set plate 115 along the guide slot 166 causes the lever 150 to swing counterclockwise so that the slide member 152 is caused to move obliquely-upwardly against the urging of the tension spring 156 and the film guide 158 is advanced upwardly through the extension 155 and the projecting member 157, forming a fulcrum at the hinge 159. After moving upwardly at a certain angle, that is past dead center, the film guide 158 is promptly sprung up by the toggle spring 160 to a position where the top 162 thereof engages the aperture 161 of the take-up spool 112 (see FIG. 2). The above sequence is effected merely by advancing the set plate 115.

Upon release of the knob 124, the set plate 115 is returned by the spring 129 only to a position a little lower than its fully retracted position since the detent 136 of the rocker arm 130 is brought to the upper position of the detent 122 of the set plate 115 in such a manner that the detent 122 abuts detent 136 and prevented from moving upwardly, as shown in FIG. 13. By reason of this limiting operation, the set plate 115 is stopped at just a bit lower position than the upper retracted position thereof and accordingly any trouble is not brought about to the upward movement of the film guide 146, as stated later.

The shutter release button is then depressed to operate the film transporting claw and the shutter in the usual manner and at the same time the drive shaft 139 is rotated. The rotation of the shaft 139 is transmitted to the roller 125 through the pulley 128, the spring belt 127 and the pulley 126 since the lug 142 engages the recess 143 as shown in FIGURE 15. As a result, the roller 125 causes the film F to rotate together with the spool in the direction indicated by the arrow in FIGURE 12, i.e., in the film feed direction. Further the take-up shaft 114 is rotated in the direction indicated by the arrow in the FIGURE 2 to wind the film so that the bifurcated top 162 of the film guide 158 engages the film engaging aperure 161 and checks rotation of the spool 112. In this case, only the shaft 114 on which the spool 112 is mounted rotates.

When the lead end of the film on the feed spool 111 reaches the upper part 148 of the film guide 146, said lead end is guided along the inner part of the film guide wall 146 to the film gate, being bent in the direction opposite to the bending tendency proper to the film. Further the film is advanced by the film transporting claw in the same manner as in conventional cameras. During such guiding of the lead end of the film along the inner part of the film guide wall 146, the film guide 146 is pushed upward by the tension of the film itself. After being moved upwardly beyond its dead center position, the guide 146 is promptly fully retracted and engaged with the hook-shaped part 121. Thus, the film transported through the film gate is passed between the guiding roller 169 and the hinge 149 and then is guided along the film guide 158 into the film engaging aperture 161 of the spool 112. When the lead end of the film is run against the take-up shaft 114 and thereby stopped advancing, the film transported continuously by the film transporting claw presses the film guide 158 downwardly. When moved downwardly below its dead center position the film guide 158 is promptly returned to the original retracted position by the toggle spring 160.

The above mentioned sequence is effected with the camera side lid open, observing the progress of film transportation. When the lead end of the film is in the state of being wound on the take-up spool 112, the film advance is stopped by releasing the shutter release button and the side lid of the camera is closed. The shaft 137 depressed by the closing of the camera side lid, as shown in FIGURE 6 and as a result, the pulley 128 is raised against the urging of the spring 140 through the lever 145, and the coupling between the shaft 139 and the shaft 141 is broken so that in photographing, only the driving and rotating shaft 139 may be rotated.

At the same time, the bent-up edge 133 of the rocker arm 130, which is arranged in the operation area of the taper cone 134 as shown in FIGURES 2, 3 and 5, is pushed outwardly by downward movement of the taper cone 134, so that the rocker arm 130 is swung counterclockwise about the shaft 131 as shown in FIGURE 4 and the roller 125 at the end thereof is withdrawn to its retracted position out of engagement with the film wound on the spool 111. On the other hand, the detent 136 is slid out of the path of the detent 122 permitting the set plate 115 and the film guide 146 to move upwardly under the influence of the springs 129 and 149 to their respective original fully retracted positions. The camera is now employed in the usual cinecamera.

In the structure last described, merely the advance of the set plate after the supply and take-up spools have been mounted on the supply and take-up shafts shifts the upper and lower film threading guides and the film feed drive to their advanced active threading positions. Further, during film guiding operation, said film guides are automatically returned to their respective original positions by the tension of the film itself. By closing the camera side lid, on the other hand, since the driving and rotating member is withdrawn from the driving position and at the same time connection of the power connecting and disconnecting member is cut off, film loading operation can be carried out with great ease, speed and accuracy. Besides, after the side lid is closed, connection between the driving and rotating member for film loading and the supply spool is cut off through such two steps as mentioned above, so that any load against the power source is eliminated and film transportation during photographing can be carried out with accuracy and without fail. Also, the arrangements of the present invention has an excellent advantage that it can be easily incorporated into the casing of such a cinecamera as commonly used since the structure is much simpler than that of other arrangements of this sort.

While there have been described and illustrated preferred embodiments of the present invention it is apparent that numerous alterations, omissions and additions may be made without departing from the spirit thereof.

What is claimed is:

1. An automatic film threading mechanism comprising a feed spool and a take-up spool, main drive means for rotating said take-up spool, a first film guide means disposed adjacent said feed spool and movable between an advanced film guide position and a retracted position, a second film guide means disposed adjacent said take-up spool and movable between an advanced film guide position and a retracted position, auxiliary means for driving the film in said feed spool and movable between an advance film drive condition and a dormant condition and including means for coupling said auxiliary drive means to said main drive means, and selectively actuatable means for effecting the uncoupling between said main drive and said auxiliary drive means, and selectively actuatable means movable between an advanced and a retracted position for advancing said first guide means to its film guide position and said auxiliary means to its drive condition.

2. An automatic film threading mechanism comprising a feed spool and a take-up spool, main drive means for rotating said take-up spool, a first film guide means disposed adjacent said feed spool and movable between an advanced film guide position and a retracted position, a second film guide means disposed adjacent said take-up spool and movable between an advanced film guide position and a retracted position, auxiliary means for driving the film in said feed spool and movable between an advance film drive condition and a dormant condition, selectively actuatable means movable between an advanced and a retracted position for advancing said first guide means to its film guide position and said auxiliary means to its drive condition, and a film transfer member disposed proximate to said feed spool and movable between advanced and retracted positions adjacent to said feed spool and said first guide means respectively, said film transfer member being advanced and retracted with said selectively actuatable means.

3. The film threading mechanism of claim 2, including means for releasably locking said actuatable means in said advanced position and responsive to engagement of said film by said transfer member for releasing said actuatable member for return to its retracted position.

4. An automatic film threading mechanism comprising a feed spool and a take-up spool, main drive means for rotating said take-up spool, a first film guide means including a sprocket wheel and disposed adjacent said feed spool and movable between an advanced film guide position and a retracted position, means for alternatively coupling and uncoupling said sprocket wheel from said main drive means, a second film guide means disposed adjacent said take-up spool and movable between an advanced film guide position and a retracted position, auxiliary means for driving the film in said feed spool and movable between an advance film drive condition and a dormant condition, and selectively actuatable means movable between an advanced and a retracted position for advancing said first guide means to its film guide position and said auxiliary means to its drive condition.

5. The film threading mechanism of claim 1, wherein said take-up spool includes an axially slotted film receiving hub and said second film guide means comprises a swingable arm, and including toggle spring means alternatively urging said arm on opposite sides of a dead center position toward an advanced position in engagement with and a retracted position out of engagement with said hub.

6. The film threading mechanism of claim 5, wherein said arm is responsive to the pressure of film thereon to swing to said retracted position.

7. The film threading mechanism of claim 2, wherein said auxiliary drive means rotates said film on said feed spool in a take-up direction when said auxiliary drive means is in a drive condition.

8. The film threading mechanism of claim 1, wherein said first guide means includes a swingable curved track member pivoted at one end thereof and having its other end free and movable between its advanced and retracted positions respectively in and out of engagement with film carried by said feed spool.

9. The film threading mechanism of claim 8, including toggle spring means urging said track member alternatively at opposite sides of a dead center to its advanced and retracted positions.

10. An automatic film threading mechanism comprising a feed spool and a take-up spool having a slotted hub, a main drive means for rotating said take-up spool, a guide plate disposed adjacent said feed spool, a sprocket wheel movable between advanced and retracted positions respectively relatively proximate and spaced from said guide plate and coupled to said main drive means, a film transfer member movable between advanced and retracted positions proximate said feed spool and said sprocket wheel respectively, a track member alternatively movable between advanced and retracted positions in and out of engagement with said take-up spool hub, means releasably locking said transfer member in advanced position, means responsive to the engagement of film by said transfer member for releasing said transfer member to its retracted position, auxiliary drive means for reversely rotating the film on said feed spool, a first selectively actuatable means for advancing said sprocket wheel and said transfer member, and a second selectively actuatable means for decoupling said sprocket wheel and said auxiliary drive means from said main drive means.

11. The film threading mechanism of claim 8, wherein said auxiliary drive means rotates said film in a feed direction.

12. An automatic film threading mechanism comprising a feed spool and a take-up spool having a slotted hub, a main drive means for rotating said take-up spool, a guide plate disposed adjacent said feed spool and being pivoted at one end and having its other end swingable between advanced and retracted positions, respectively engaging and spaced from the film on said feed roll, a track member alternatively movable between advanced and retracted positions in and out of engagement with said take-up spool hub, auxiliary drive means coupled to said main drive means for rotating said film on said feed spool, means releasably locking said auxiliary drive means out of engagement with said film, first selectively actuatable means for advancing said guide plate and track member and releasing said locking means, and second selectively actuatable means uncoupling said auxiliary drive means from said main drive means.

References Cited
UNITED STATES PATENTS

| | | | |
|---|---|---|---|
| 2,051,788 | 8/1936 | Foster et al. | 242—55.11 |
| 2,891,736 | 6/1959 | Blaes | 242—55.13 |
| 3,205,506 | 9/1965 | Lessler | 242—55.11 |
| 3,208,682 | 9/1965 | Pastor et al. | 242—55.12 |
| 3,222,007 | 12/1965 | Schmuck | 242—55.11 |

FRANK J. COHEN, *Primary Examiner.*

GEORGE F. MAUTZ, *Examiner.*